Sept. 16, 1930.  W. SALISBURY  1,775,831
PLANT POT
Filed Feb. 23, 1927
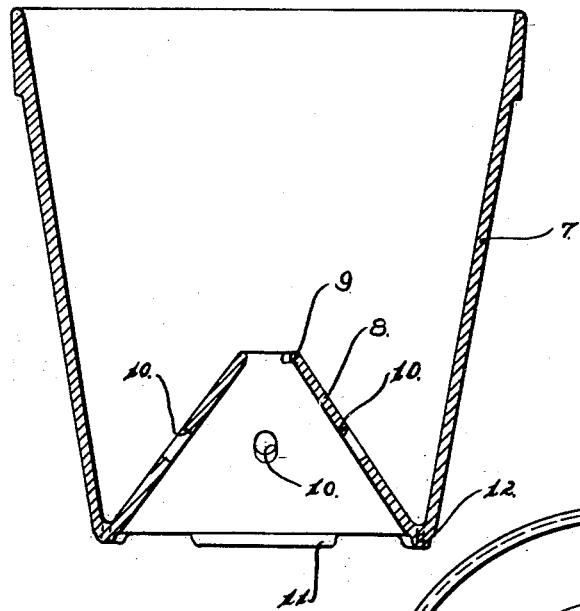
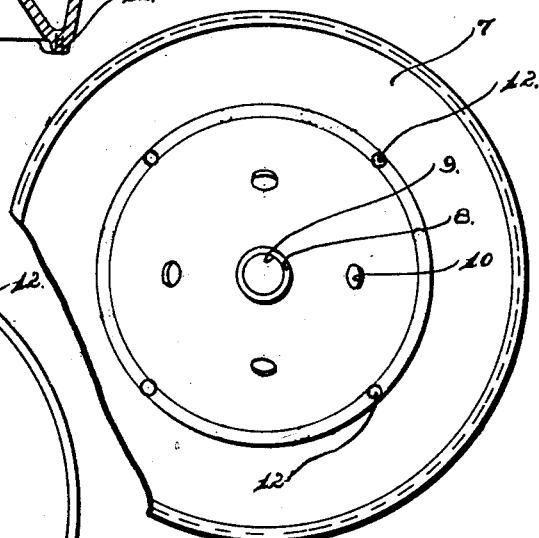
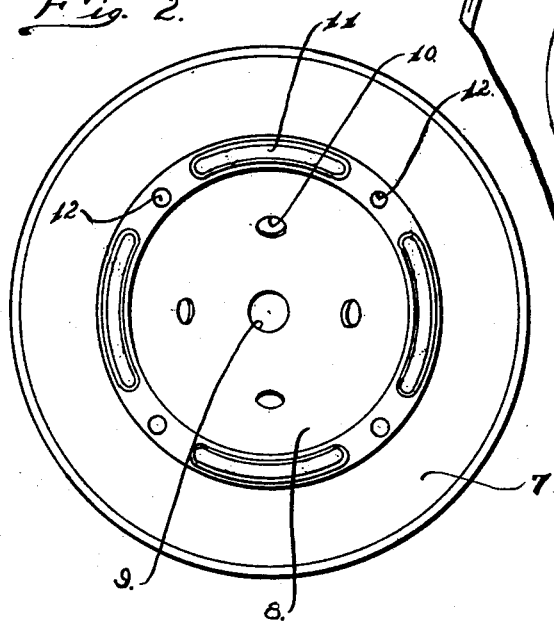
INVENTOR.
William Salisbury.
BY
ATTORNEY.

Patented Sept. 16, 1930

1,775,831

UNITED STATES PATENT OFFICE

WILLIAM SALISBURY, OF DETROIT, MICHIGAN

PLANT POT

Application filed February 23, 1927. Serial No. 170,127.

My invention relates to a new useful improvement in a plant pot such as is customarily used for individual growing plants in green houses, homes, etc. When these pots are used, it has been found that the earth contained within the pot and in which the plant is growing, becomes packed, particularly at the base, so that a free growing of the roots is considerably checked, and oftentimes prevented, resulting in the death of the plant. The earth enclosed with the pot is sealed from the air except at the exposed surface at the open end of the pot, and on account of the depth of the pot it has been found that this area exposed to the air is not sufficient to permit the proper growth and cultivation of the plants, as the access of the air to the roots is desirable, and is quite important in retaining the earth in that loose condition about the roots which is so desirable to, and beneficial for, rapid and unstinted growth.

It is an object of the present invention, therefore, to provide a pot in which the packing of the earth at the lower portion may be prevented and in which a maximum amount of air may be delivered to roots, so that the necessary aeration thereof may be effected, and a full and healthy growth of the plant brought about.

It is another object of the invention to provide a plant pot in which the aeration of the roots may take place to the proper degree, and at the same time, the earth, while aerated in this manner, may be provided at all times with the proper moisture.

Other objects will appear hereinafter.

The invention consists in the combination and arrangement of parts hereinafter described and claimed.

The invention will be best understood by a reference to the accompanying drawings, which form a part of this specification, and in which, Fig. 1 is a central vertical sectional view of the invention.

Fig. 2 is a bottom plan view of the invention.

Fig. 3 is a fragmentary top plan view of the invention.

As shown in the drawings, the invention comprises a receptacle or plant pot of conventional circular cup-shaped form having upwardly outwardly tapered imperforate side wall 7. The base comprises a flat minor portion extending about the outer edge thereof at a right angle to the axis of the pot. A centrally inwardly dished portion or cone 8 is provided in the base, the dished portion, which may be of various heights terminating in open top 9. This major base portion 8 provides an interior bottom having a continuous descent from the open top 9 to the junction of the side wall and bottom, and is normally provided with perforations 10, the number of these perforations varying depending upon the amount of aeration of the roots desired, this being determined to a great extent by the nature of the plant with which the pot is to be used. The perforations 10, in short cones, may be eliminated entirely.

The minor base portion is provided with a peripheral series of thickened portions 11 thereabout which not only serve as reinforcements for the base but as legs or supporting members projecting outwardly from the edge of the bottom. The bottom between each pair of these legs is a normal thickness region having a vertical opening 12 formed therein which extends into the interior of the pot proper terminating at the junction of the base and side wall. These openings provide ventilation as well as drainage from the extreme low point of the pot interior thereby avoiding any wet spots therein. The major base portion being a continuous descent from the high point thereof cooperates in obtaining this result.

When the plant is to be planted in the pot, the earth is placed in the pot in the usual manner, with the plant supported therein, this earth engaging the wall 9 of the inwardly projecting cone shaped bottom. After the earth has been properly packed in the pot, practically none of the earth will pass through the opening 9. The roots of the plant, after growing has progressed to a certain degree, will be extended around the inwardly projected cone shaped bottom, and the openings 10, as well as the opening 9, will permit proper aeration of these roots, bringing about the desired effect.

These pots are generally placed in a saucer for the purpose of catching such surplus water as may drip therefrom, and the openings 12 permit this surplus water to seep into the earth, thus assuring proper watering of the roots around the aerated portion.

I am aware that there have been devices for supporting the earth in elevated relation to the bottom of the pot, and that there have been inwardly projecting cone shaped bases of watering devices for plant pots, but the present invention has particularly, as its object, the aerating of the roots by means of the inwardly cone shaped projection, as well as retaining the earth in a loose and properly moistened condition, and this respect I believe that the invention is novel. The formation of the inwardly projecting cone shaped bottom as an integral part of the pot is one which is important in the manufacture of these devices as it permits these one-piece earthenware pots to be cast to form in a single operation for an economical manufacture of the pots, and at the same time provides a pot which is of considerable strength and rigidity, the cone shaped structure being projected within the pot proper, and serving as a reinforcement for the converging end of the side walls. The reinforcing portions or ribs 11, and the vertical openings 12 are formed in the single operation. This adds strength to the base due to the integral construction. The openings 12, being parallel to the axis of the pot, can be formed by pins carried by the mold, for the pins may be withdrawn without tearing the pot.

The openings 9, 10 and 12 will also provide for a quick drainage of any surplus water which may be deposited on the earth contained in the pot, so that a rotting of the roots may be prevented, and the presence of excess moisture surrounding the same obviated. Furthermore, the presence of the openings, in addition to permitting the aeration of the roots, will permit a ready evaporation of such excess moisture as may be absorbed by the earth in the pot.

While I have illustrated and described the preferred form of construction, I do not wish to limit myself to the precise details of structure shown, but desire to avail myself of such variations and modifications as come within the scope of the appended claims.

Having thus described my invention, what I claim as new and desire to secure by Letters Patent is:

1. A one-piece earthenware plant pot cast-to-form provided with a base, an imperforate side wall extending upwardly and outwardly from said base, a series of vertical openings extending downwardly through said base from the pot interior at the junction of the wall and base and said base having a peripheral series of thickened regions between said openings.

2. A one-piece earthenware plant pot cast-to-form comprising a base and an imperforate side wall upwardly extending therefrom, said base being provided with a peripheral series of reinforcing thickened regions about the outer edge thereof, a series of vertical openings through said base between said reinforcing regions extending from the low point of the pot interior and a centrally inwardly dished portion in said base having ventilating means therethrough.

3. A one-piece earthenware plant pot cast-to-form comprising a base and an imperforate side wall upwardly extending therefrom, said base being provided with thickened regions forming an annular series of ribs about the periphery thereof as reinforcements therefor while providing normal thickness regions therebetween, a vertical opening through one of said normal thickness regions between the ribs extending from the junction of said base and side wall.

4. A one-piece earthenware plant pot cast-to-form comprising a circular tapered cup-shaped receptacle having an imperforate side wall, a base on said receptacle at right angles to the axis of said pot having a flat minor portion extending about the outer edge of said base, a centrally inwardly dished major portion therefrom providing an interior bottom having a continuous descent from the central portion thereof to the junction of said bottom and side wall, said minor base portion being provided with a series of thickened portions thereabout and having openings parallel to the axis of said pot extending from the junction of said side wall and base downwardly through said bottom between the thickened base portions.

In testimony whereof I have signed the foregoing specificaton.

WILLIAM SALISBURY.